US010711691B2

(12) United States Patent
Diehm et al.

(10) Patent No.: US 10,711,691 B2
(45) Date of Patent: Jul. 14, 2020

(54) CONNECTING ROD FOR VARIABLE COMPRESSION INTERNAL COMBUSTION ENGINE

(71) Applicant: ECO Holding 1 GmbH, Marktheidenfeld (DE)

(72) Inventors: Alexander Diehm, Wertheim-Dertingen (DE); Dietmar Kaufmann, Tiefenthal (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 129 days.

(21) Appl. No.: 15/820,948

(22) Filed: Nov. 22, 2017

(65) Prior Publication Data

US 2018/0179949 A1    Jun. 28, 2018

(30) Foreign Application Priority Data

Dec. 22, 2016   (DE) ......................... 10 2016 125 460
Sep. 15, 2017   (DE) ......................... 10 2017 121 425

(51) Int. Cl.
*F02B 75/04*       (2006.01)
*B21J 15/12*       (2006.01)
(Continued)

(52) U.S. Cl.
CPC ............ *F02B 75/045* (2013.01); *B21J 15/02* (2013.01); *B21J 15/12* (2013.01); *C21D 9/0093* (2013.01);
(Continued)

(58) Field of Classification Search
CPC ... F02B 75/045; F16C 7/06; B21J 5/02; B21J 5/12; Y02P 10/253; C21D 1/42;
(Continued)

(56) References Cited

U.S. PATENT DOCUMENTS 4,486,940 A * 12/1984 Valori .................... B22F 7/062
                                                    112/228
5,076,149 A * 12/1991 Everts ....................... F16J 1/18
                                                    123/193.6
(Continued)

FOREIGN PATENT DOCUMENTS

DE    102013014090 A1   3/2015
DE    102014109452 A1   1/2016
(Continued)

*Primary Examiner* — Hung Q Nguyen
*Assistant Examiner* — Mark L. Greene
(74) *Attorney, Agent, or Firm* — Von Rohrscheidt Patents

(57) ABSTRACT

A connecting rod for a variable compression internal combustion engine, the connecting rod including a crank bearing eye for connecting the connecting rod with a crank shaft; a connecting rod bearing eye configured to connect the connecting rod with a cylinder piston of the internal combustion; an eccentrical element adjustment arrangement configured to adjust an effective connecting rod length, wherein the eccentrical element adjustment arrangement includes an eccentrical element that cooperates with an eccentrical element lever, wherein the eccentrical element is configured to receive a wrist pin of the cylinder piston, wherein the eccentrical element adjustment arrangement includes at least one cylinder with a piston that is displaceably supported in a cylinder bore hole and connected with a support rod, wherein the eccentrical element lever includes two eccentrical element lever segments which are connected by at least one connecting bolt to which the support rod is pivotably connected.

4 Claims, 2 Drawing Sheets

(51) Int. Cl.
*F16C 7/06* (2006.01)
*B21J 15/02* (2006.01)
*C21D 9/00* (2006.01)
*C21D 1/42* (2006.01)

(52) U.S. Cl.
CPC ............... *F16C 7/06* (2013.01); *C21D 1/42* (2013.01); *C21D 2221/01* (2013.01); *Y02P 10/253* (2015.11)

(58) Field of Classification Search
CPC ...... C21D 9/0093; C21D 9/30; C21D 10/005; C21D 2221/01; C21D 1/09; C21D 1/10; C21D 1/40; C21D 8/1294; C21D 9/28; B23K 26/352; B23K 26/354; H05B 6/40; H05B 6/101
See application file for complete search history.

(56) References Cited

U.S. PATENT DOCUMENTS

| | | | |
|---|---|---|---|
| 6,335,506 B2 * | 1/2002 | Christmas | C21D 1/09 219/121.66 |
| 2015/0059683 A1 * | 3/2015 | Schulze | F02B 75/045 123/197.3 |
| 2018/0238382 A1 * | 8/2018 | Huber | F16C 23/10 |

FOREIGN PATENT DOCUMENTS

| | | |
|---|---|---|
| DE | 102015122393 A1 | 6/2016 |
| DE | 102015109922 A1 | 9/2016 |
| EP | 2843209 A1 | 3/2015 |
| WO | WO2015173391 | 11/2015 |

* cited by examiner

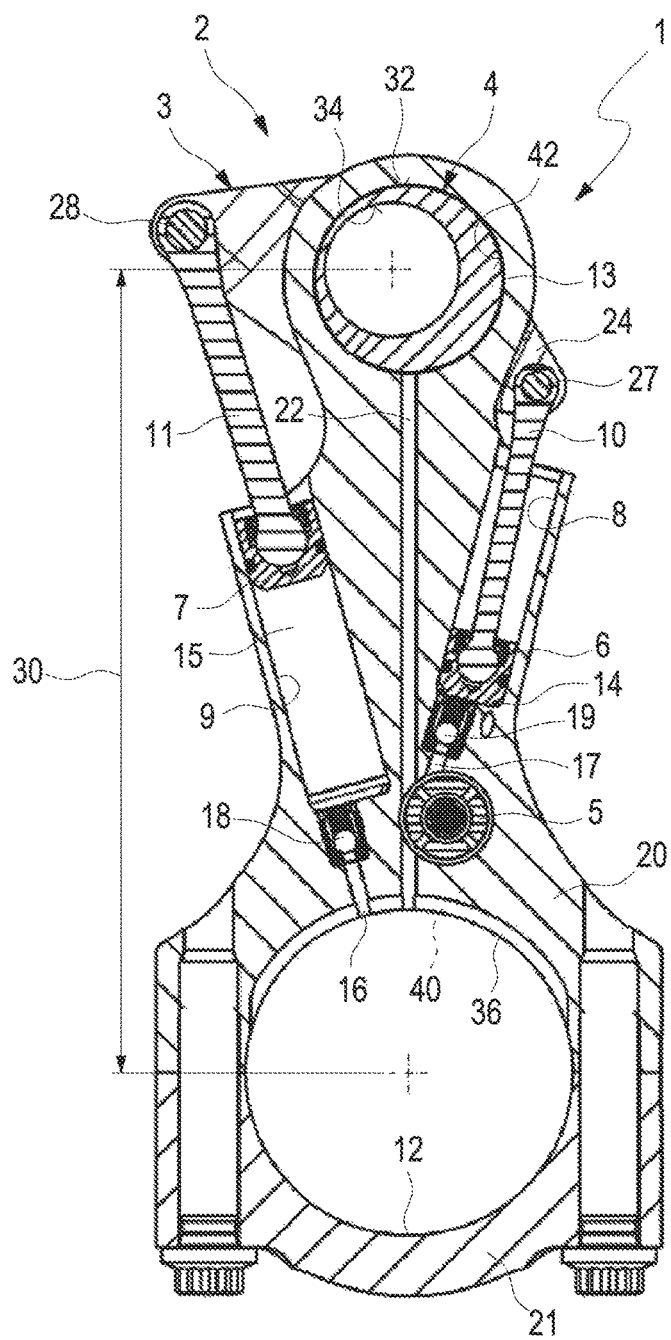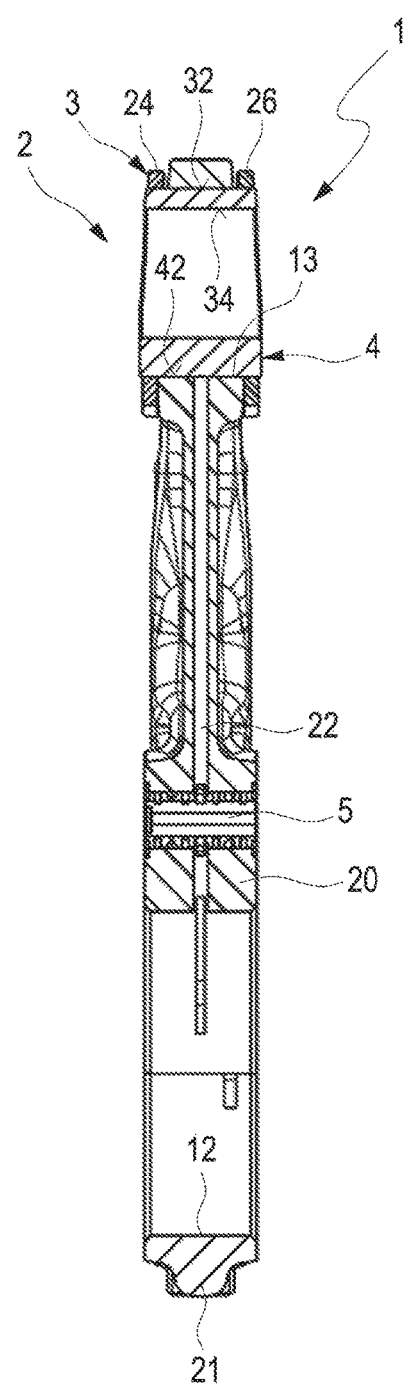
FIG. 1
(A-A)
FIG. 2

CONNECTING ROD FOR VARIABLE COMPRESSION INTERNAL COMBUSTION ENGINE

RELATED APPLICATIONS

This application claims priority from and incorporates by reference German Patent Applications DE10 2016 125 460.6 filed on Dec. 22, 2016 and DE10 2017 121 425.9 filed on Sep. 15, 2017.

FIELD OF THE INVENTION

The invention relates to a connecting rod for a variable compression internal combustion engine and to a method for producing an eccentrical element lever of the connecting rod and a variable compression internal combustion engine with the connecting rod.

BACKGROUND OF THE INVENTION

In internal combustion engines a high compression ratio has a positive effect upon efficiency of the internal combustion engine. Compression ratio is typically designated as a ratio of an entire cylinder volume before compression divided by a remaining cylinder volume after the compression. In internal combustion engines with external ignition in particular gasoline engines which have a fixed compression ratio, the compression ratio, however, must only be selected up to a level where a so called knocking of the internal combustion engine under full load operations is avoided. However, the compression ratio can be selected with higher values for the much more prevalent partial load operation of the internal combustion engine thus with a low cylinder charge, without the knocking occurring. The important partial load operations of an internal combustion engine can be improved when the compression ratio is variably adjustable. In order to adjust the compression ratio systems with variable connecting rod length are known which actuate an eccentrical element adjustment device of a connecting rod through hydraulic switch valves.

DE10 2013 014 090 A1 describes for example a two piece configuration of an eccentrical element lever whose eccentrical element lever segments are connected by connecting bolts.

BRIEF SUMMARY OF THE INVENTION

Thus, it is an object of the invention to provide an improved cost effective connecting rod for a variable compression internal combustion engine which has a high service life.

It is another object of the invention to provide a method for producing an eccentrical element lever of a connecting rod and an internal combustion engine with variable compression with the connecting rod.

The object is achieved by a connecting rod for a variable compression internal combustion engine, the connecting rod including a crank bearing eye for connecting the connecting rod with a crank shaft of the variable compression internal combustion engine; a connecting rod bearing eye configured to connect the connecting rod with a cylinder piston of the internal combustion; an eccentrical element adjustment arrangement configured to adjust an effective connecting rod length, wherein the eccentrical element adjustment arrangement includes an eccentrical element that cooperates with an eccentrical element lever, wherein the eccentrical element is configured to receive a wrist pin of the cylinder piston, wherein the eccentrical element adjustment arrangement includes at least one cylinder with a piston that is displaceably supported in a cylinder bore hole and connected with a support rod, wherein the eccentrical element lever includes two eccentrical element lever segments which are connected by at least one connecting bolt to which the support rod is pivotably connected, wherein the at least one connecting bolt is configured as a cylindrical roller which protrudes with end portions at outer surfaces of the eccentrical element lever segments and which is heat treated at least in the end portions.

The object is also achieved by a method for producing the eccentrical element lever of the connecting rod, the method including the steps preassembling the at least two eccentrical element lever segments by pressing the at least one connecting bolt in bearing bore holes of the eccentrical element lever segments, wherein the at least one connecting bolt is configured as a cylindrical roller which protrudes with the end portions at the outer surfaces of the eccentrical element lever segments; and performing a heat treatment at least at the end portions.

Advantageous embodiments and advantages of the invention can be derived from the dependent claims, the description and the drawing figures.

A connecting rod for a variable compression internal combustion engine is proposed, the connecting rod including a crank bearing eye for connecting the connecting rod with a crank shaft of the internal combustion engine, a connecting rod bearing eye for connecting the connecting rod with a cylindrical piston of the internal combustion engine and an eccentrical element adjustment device for adjusting an effective connecting rod length wherein the eccentrical element adjustment device includes an eccentrical element that cooperates with an eccentrical element lever wherein the eccentrical element is configured to receive a wrist pin of the cylindrical piston. The eccentrical element adjustment device includes at least one cylinder with a piston that is supported in a slideable manner in a cylinder bore hole and connected with a support rod. Furthermore the eccentrical element lever includes two eccentrical element lever segments which are connected by at least one connecting bolt to which the support rod is pivotably linked. The at least one connecting bolt is configured as a cylindrical roller which protrudes with end portions at outer surfaces of the eccentrical lever segments and which is heat treated at least in the end portions.

According to the invention the two eccentrical element lever segments of the eccentrical element lever are connected by two cylindrical rollers configured as connecting bolts which simultaneously form the axle or the support of the support rods of the eccentrical element adjustment device. Advantageously the two eccentrical element lever segments of the eccentrical element lever can be preassembled into a unit by two cylindrical rollers which are secured by a pressed interconnection. By heat treating and annealing the end portions of the cylindrical rollers in the portion of the face sides of the cylindrical rollers an additional axial securing of the cylindrical rollers can be provided by a forming process, e.g. a riveting process. Advantageously DIN standard components can be used as cylindrical rollers wherein the DIN components can be procured in large numbers in a cost effective manner. DIN cylindrical rollers are typically hardened throughout.

In addition to the DIN cylindrical rollers partially hardened cylindrical rollers can be used which, however, also have to be annealed at their faces, thus have to be heat treated in order to be able to perform a forming process at the end portions.

It is an advantage of the invention that the press connection between the cylindrical rollers and the eccentrical element lever allows a precise preassembly. The cylindrical rollers are producible as standard components in a cost effective manner. Furthermore impressing the hard components prevents scaling. The annealing process can be performed in a cost effective manner. Furthermore the hardened cylinder surfaces of the cylindrical rollers form a friction partner for the support rod supported thereon. Furthermore the annealing of the face sides of the cylindrical rollers facilitates forming the end portions by a forming process. Thus, the cylindrical rollers can be secured in the interconnection of the eccentrical element lever against unintentionally sliding out.

According to an advantageous embodiment the end portions of the at least one connecting bolt can be provided formed after assembly in the eccentrical element lever so that the eccentrical element lever segments cannot slide off from the connecting bolts anymore. Thus, the subassembly of the eccentrical element lever can be secured after assembly.

According to an advantageous embodiment the end portions can be provided riveted. Advantageously for example wobble riveting or radial point riveting can be used in order to form and rivet the end portions from the faces of the cylinder bolts. This way the end portions of the cylinder bolts can be enlarged in diameter so that the eccentrical element lever segments cannot slide off from the cylindrical bolts anymore.

According to an advantageous embodiment the at least one connecting bolt can be provided partially hardened in a portion of the pivotable support of the support rod. The partially hardened cylinder surfaces of the cylindrical rollers form an advantageous friction partner for the support rod of the eccentrical element adjustment device supported thereon. This way advantageous running properties of a bearing of the eccentrical element lever segments on the cylindrical roller are provided which reduces wear of the eccentrical element lever segments. Furthermore the cylindrical roller is thus made sufficiently wear resistant and abrasion resistant in the bearing portion.

According to an advantageous embodiment the portion of the linked support can be provided partially hardened at least in a surface portion. Advantageously at least the surface portion can be provided partially hardened to achieve advantageous running properties of the cylindrical rollers in the eccentrical element lever segments. For example it is advantageous when at least a few tenths of a millimeter material below the surface of the cylindrical rollers in the bearing portion are hardened.

According to an advantageous embodiment the end portions can be configured heat treated in a portion of an overhang axially outside of the portion of the pivotable support. The annealed portion of the cylindrical roller can be advantageously provided only in the portion of the overhang outside of the bearing portion, whereas the bearing portion itself is advantageously provided hardened. Thus, the end portion can be advantageously formed, for example riveted whereas the bearing portion advantageously remains hardened which is advantageous for the running properties of the cylindrical roller.

According to an advantageous embodiment the end portions can be provided heat treated by a laser process. Laser devices can be advantageously used for annealing the cylindrical rollers. Thus advantageous annealing values for example in a range of 35-40 HRC can be achieved which is advantageous for standard cylindrical rollers with diameters of 5-6 mm.

According to an advantageous embodiment the end portions can be provided heat treated by inductive heating. Alternatively it is also conceivable to perform the annealing process by inductive heating. This way the annealed portion of the cylindrical roller can be sufficiently limited in three dimensions so that only the portion of the overhang of the cylindrical roller outside of the eccentrical element lever segment is annealed while the bearing portion of the cylindrical roller remains hardened.

According to an advantageous embodiment the at least one connecting bolt can be provided pressed into support bore holes of the eccentrical lever segments. Advantageously the connecting bolt can be pressed into the bearing bore holes of the eccentrical element lever segments during pre-assembly of the eccentrical element lever. Thus the subassembly is advantageously fixed in a preliminary manner and can be advantageously secured against the cylindrical roller and the eccentrical element lever by annealing and riveting.

According to another aspect of the invention a method is proposed for producing an eccentrical element lever of a connecting rod, the method comprising the steps: preassembling at least two eccentrical element lever segments by pressing at least one connecting bolt in bearing bore holes of the eccentrical element lever segments, wherein the connecting bolt is configured as a cylindrical roller which protrudes with end portions at outer surfaces of the eccentrical element lever segments and performing a heat treatment at least at the end portions.

Advantageously the connecting bolts can be pressed into the bearing bore hole in a hardened condition which prevents chips from being formed by abrasion at the connecting bolts. After the preassembly the end portions of the connecting bolts can be advantageously heat treated, thus annealed in order to soften the end portions enough so that a subsequent forming process can be performed in a simple manner.

According to an advantageous embodiment the end portions of the at least one connecting bolt can be formed for axially securing them after being mounted in the eccentrical element lever. Forming facilitates expanding the end portions of the connecting bolts so that the eccentrical element lever segments cannot slide off from the connecting bolts anymore. Thus, the sub assembly of the eccentrical element lever can be secured after assembly.

According to an advantageous embodiment the end portions can be riveted. Advantageously for example wobble riveting can be used in order to form the end portions from the end portions of the cylindrical bolts and to rivet them. This way the end portions of the cylindrical bolts can be provided with expanded diameters so that the eccentrical element lever segments cannot slide off from the cylindrical bolts anymore.

According to an advantageous embodiment the end portions can be heat treated by a laser process or an inductive process. Laser devices for annealing the cylindrical rollers can be used advantageously. Thus advantageous annealing values for example in a range of 35-40 HRC can be achieved which is advantageous for standard cylindrical rollers with diameters of 5-6 mm.

Alternatively it is also conceivable to perform the annealing process by inductive heating. This way the annealed portion of the cylindrical roller can be sufficiently limited in space so that only a portion of an overhang of the cylindrical roller outside of the eccentrical element lever segment is annealed, whereas the bearing portion of the cylindrical roller remains hardened.

According to an advantageous embodiment a penetration depth of the heat treatment can be selected so that only a surface portion of the end portions is heat treated. Parameters of the heat treatment of the connecting bolts can thus be advantageously selected so that the connecting bolts are not annealed too deeply so that the connecting bolts have sufficient residual hardness for good and wear resistant running properties and on the other hand side the forming process of the end portions can be provided in an advantageous manner.

According to another aspect of the invention an internal combustion engine with at least one connecting rod is proposed. Thus a connecting rod can be advantageously used that is configured as described supra in order to advantageously implement an eccentrical element adjustment device and thus implement an advantageous combustion process and thus low fuel burn in the internal combustion engine.

BRIEF DESCRIPTION OF THE DRAWINGS

Additional advantages can be derived from the subsequent drawing description. The drawings schematically illustrate the embodiment of the invention. The drawings, the description and the claims include numerous features in combination. The person skilled in the art will advantageously view the features individually and combine them into additional useful combinations, wherein:

FIG. 1 illustrates a connecting rod according to the invention in a longitudinal sectional view;

FIG. 2 illustrates the connecting rod according to FIG. 1 in a second longitudinal sectional view and;

DETAILED DESCRIPTION OF THE INVENTION

Figure 3:
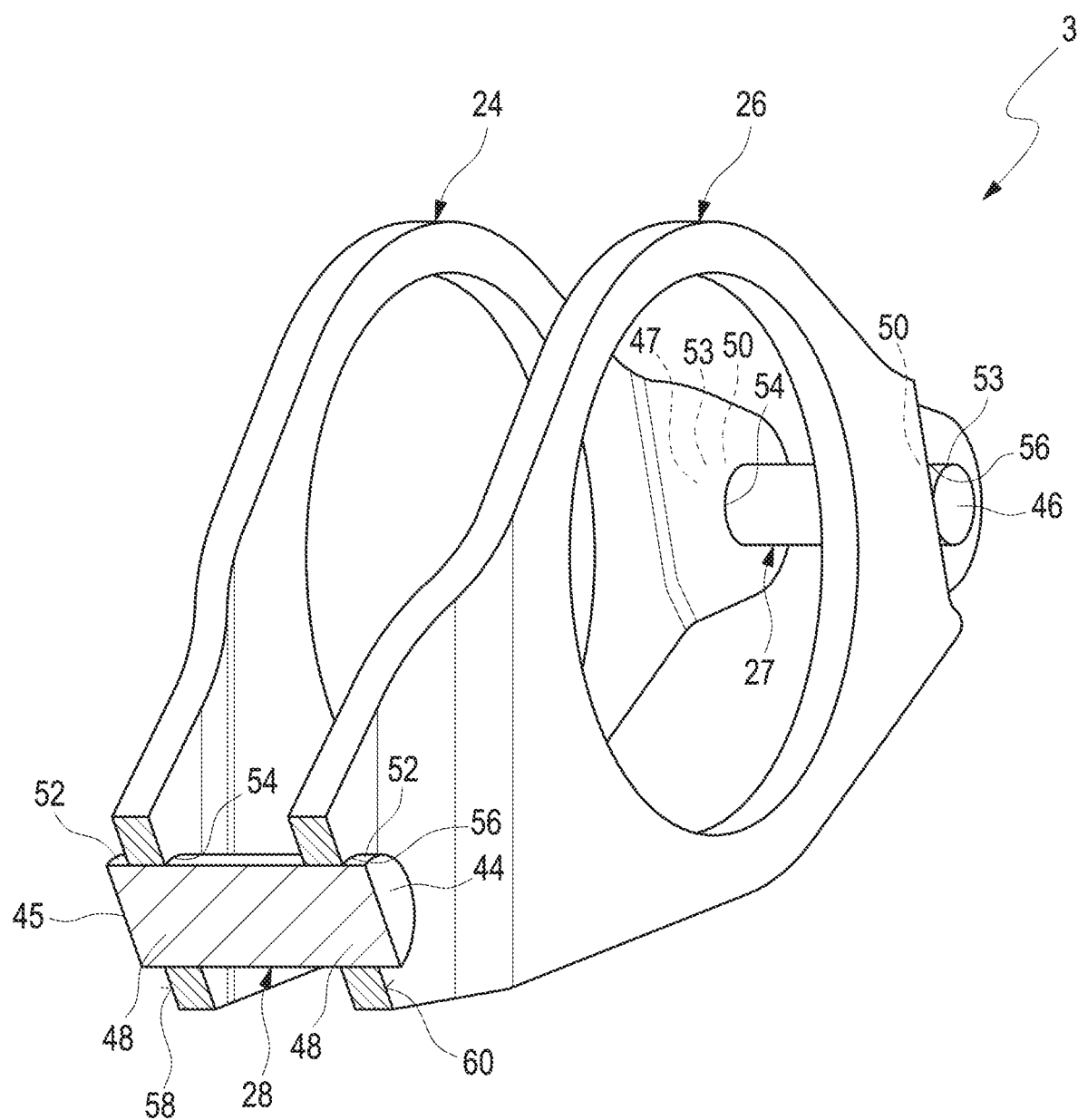
FIG. 3 illustrates an eccentrical element lever of the connecting rod according to FIGS. 1 and 2 in a three dimensional partial sectional view.

In the drawing figures identical or like components are designated with identical reference numerals. The figures only illustrate exemplary embodiments and do not limit the scope and spirit of the invention.

FIG. 1 illustrates a schematic view of a connecting rod 1 according to the invention for a variable compression internal combustion engine, the connecting rod including an eccentrical element adjustment device 2 for adjusting an effective connecting rod length 30 which is defined as a distance of a center axis of the crank bearing eye 12 from the center axis of the bore hole of the eccentrical element 4 to receive a wrist pin. The eccentrical element adjustment device 2 includes an eccentrical element 4 that cooperates with a multi component eccentrical element lever 3 in which a non-illustrated wrist pin of a cylinder piston is received. An adjustment travel of the eccentrical element adjustment device 2 is adjustable by a switch valve 5.

A rotation of the adjustable eccentrical element adjustment device 2 is initiated by an impact of mass forces and load forces of the internal combustion engine which impact the eccentrical element adjustment device 2 during a power stroke of the internal combustion engine. During a power stroke effective directions of forces impacting the eccentrical element adjustment device 2 vary continuously. The rotation or adjustment travel is supported by one or plural pistons 6, 7 loaded with hydraulic fluid, in particular with engine oil and integrated in the connecting rod 1, or the pistons 6, 7 prevent a resetting of the eccentrical element adjustment device 2 based on varying force effective directions of forces impacting the eccentrical element adjustment device 2.

The pistons 6, 7 are respectively displaceably supported in a cylinder bore hole 8, 9 of a hydraulic cylinder 14, 15 of the connecting rod 1 and connected with supports rod 10, 11 which are in turn pivotably connected with the eccentrical element lever 3.

The connecting rod 1 includes a crank bearing eye 12 for connecting the connecting rod 1 to a crank shaft of an internal combustion engine and a connecting rod bearing eye 13 for connecting the connecting rod 1 to a cylinder piston of the internal combustion engine.

The pistons 6, 7 are displaceably arranged in the hydraulic chambers 14, 15 formed by the cylinder bore holes 8, 9 and loaded through inlets 16, 17 from the crank bearing eye 12 with hydraulic fluid, for example motor oil through check valves 18, 19. The check valves thus prevent a flow back of the hydraulic fluid from the hydraulic chambers 14, 15 back into the inlets 16, 17 but facilitate a suction of hydraulic fluid into the hydraulic chambers 14, 15.

The hydraulic chambers 14, 15 are further connected with the switch valve 5 through non-illustrated drains, wherein the switch valve can be configured as a hydraulic valve or as a mechanical valve.

As evident from FIG. 1 the connecting rod 1 includes a connecting rod body 20 and a connecting rod cover 21 attached thereto.

In order to achieve optimum lubrication of the eccentrical element 4 and the wrist pin which is essential for a function of the eccentrical element adjustment device 2 a first bore hole 22 can be provided in the connecting rod body 20 as a riser which is provided for supplying a radially outward and a radially inward bearing surface 32, 34 of the eccentrical element 4 with hydraulic fluid from a supply connection 40.

This way a lubrication film with hydraulic fluid can be built up on the radial outward bearing surface 32 between the connecting rod bearing eye 13 and the eccentrical element 4 and on the radially inner bearing surface 34 between the eccentrical element 4 and the wrist pin. The hydraulic fluid, for example motor oil, moves from the crank bearing eye 12 forming a supply connection 40 into the bore hole 22.

It is evident that the first bore hole 22 extends from the crank bearing eye 12 to the connecting rod bearing eye 13. Thus, it has fabrication advantages when the bore hole 22 extends in a straight line. A connection to the switch valve 5 is not required. The so called gallery pressure, this means the pressure of the hydraulic fluid which is provided to the crank shaft, presses the hydraulic fluid through the bore hole 22 in a direction towards the connecting rod bearing eye 13.

On a circumference of the crank bearing eye 12 a second groove 36 is provided in the portion of the connecting rod body 20 to supply the first bore hole 22 with hydraulic fluid from the supply connection 40. The second groove 36 can provide a reliable supply of the first bore hole 22 with the hydraulic fluid. Since the second groove 36 is only arranged in a portion of the circumference of the crank bearing eye 12 the load bearing capacity of the bearing is degraded as little as possible in the crank bearing eye 12.

FIG. 2 illustrates the connecting rod 1 of FIG. 1 in a second longitudinal sectional view that is rotated by 90°. It is evident that the switch valve 5 covers the entire depth of the connecting rod body 20. The bore hole 22 extends in the center of the connecting rod body 20 from the crank bearing eye 12 to the connecting rod bearing eye 13. The eccentrical element lever 3 is configured in two components respectively with an eccentrical element lever segment 24, 26 on both sides of the connecting rod bearing eye 13.

In order to distribute the hydraulic fluid at least over the radially outward bearing surface 32 an at least partially circumferential first groove can be provided which is hydraulically connected with the first bore hole 22. The first groove which is for example centrally arranged at the eccentrical element 4 thus facilitates an optimum and even distribution of the hydraulic fluid over the entire outer bearing surface 32 between the eccentrical element 4 and the connecting rod bearing eye 13.

Alternatively the first groove could also be arranged on the bearing surface 32 of the connecting rod bearing eye 13.

The eccentrical element 4 can furthermore include at least a second bore hole configured as a lubricant liquid bore hole which extends from the outer bearing surface 32 in a direction towards an inside of the eccentrical element 4 to the inner bearing surface 34, wherein the second bore hole is arranged so that the first groove and the second bore hole are operatively connected with each other. Thus, simultaneously also an optimum lubrication between the eccentrical element 4 and the wrist pin can be provided. Plural bore holes can also be provided as lubrication liquid bore holes in the eccentrical element 4.

As can be derived in particular from FIG. 3 the eccentrical element lever 3 includes 2 eccentrical element lever segments 24, 26 which are connected by two connecting bolts 27, 28. In the portion of the connection bolt 28 the eccentrical element lever 3 is illustrated in a sectional view. The non-illustrated support rods 10, 11 of the eccentrical element adjustment device 2 are provided for pivotable connection with the connecting bolts 27, 28.

In order to achieve a secure connection of the eccentrical element lever segments 24, 26 and simultaneously an optimum support of the support rods 10, 11 the connecting bolts 27, 28 are provided as cylindrical rollers according to the invention. The cylindrical rollers 27, 28 are thus secured by a pressed interconnection and facilitate to configure the eccentrical element lever 3 as a unit that can be preassembled. The eccentrical element lever segments 24, 26 can be connected in a cost effective and precise manner. For example the connecting bolts 27, 28 can be pressed into bearing bore holes 54, 56 of the eccentrical element lever segments 24, 26. In order to prevent chip formation by abrasion of the connecting bolts 27, 28 the connecting bolts 27, 28 can be advantageously impressed before performing the heat treatment process so that the heat treatment can be performed at the preassembled eccentrical element lever unit.

It is evident from FIG. 3 that the cylindrical rollers 27, 28 are configured long enough so that they protrude from the eccentrical element lever 3 after pressing them into the eccentrical element lever segments 24, 26 wherein the cylindrical rollers protrude with end portions 44, 45, 46, 47 at outer surfaces 58, 60 of the eccentrical element lever segments 24, 26.

For additional axial securing the cylindrical rollers 27, 28 are configured heat treated in the end portions 44, 45, 46, 47 so that forming, for example riveting is possible. For example the end portions 44, 45, 46, 47 of the connecting bolts 27, 28 can be formed after the heat treatment so that the eccentrical element lever segments cannot slide off from the connecting bolts 27, 28 anymore. Thus, the sub assembly of the eccentrical element lever 3 can be secured after assembly. Advantageously for example wobble riveting can be used in order to form the end portions 44, 45, 46, 47 from the face sides of the cylindrical bolts 27, 28 and riveting them. This way the end portions of the cylindrical bolts 27, 28 can be increased in diameter so that the eccentrical element lever segments 24, 26 cannot slide off from the cylindrical bolts 27, 28 anymore.

The heat treatment is performed for example by annealing the material for example by a laser process or by inductive heating. A penetration depth of the heat treatment can also be advantageously selected so that only a surface portion of the end portions 44, 45, 46, 47 is heat treated.

It can also be advantageously provided that the end portions 44, 45, 46, 47 are only heat treated in a portion of an overhang 52, 53 axially outside of the portion of the pivotable bearing 48, 50. Thus the end portion 44, 45, 46, 47 can be advantageously formed, for example riveted while the bearing portion 48, 50 advantageously remains hardened which is advantageous for the running properties of the cylindrical rollers 27, 28.

According to an advantageous embodiment a penetration depth of the heat treatment can be selected so that only a surface portion of the end portions 44, 45, 46 47 is heat treated. Parameters of the heat treatment of the connecting bolts 27, 28 can thus advantageously selected so that the connection bolts 27, 28 are not annealed too deeply so that the connection bolts 27, 28 have sufficient residual hardness for good and wear resistant running properties and on the other hand side the forming process of the end portions 44, 45, 46 and 47 is advantageously provided.

According to an embodiment of the invention the cylindrical rollers in the portion of the pivotable bearing 48, 50 of the support rods 10, 11 can be provided partially hardened. The hardened cylinder surfaces form the ideal friction partner for the support rod 10, 11 supported thereon. Alternatively the portion of the pivotable support 48, 50 can be provided partially hardened at least in a surface portion. This way advantageous running properties of a bearing of the eccentrical element lever segments 24, 26 are provided on the cylindrical roller 27, 28 which reduces wear of the eccentrical element lever segments 24, 26. Furthermore the cylindrical roller 27, 28 in the bearing portion 48, 50 thus becomes sufficiently wear resistant and abrasion resistant.

The configuration of the described connecting rod 1 is only illustrated in an exemplary manner and the eccentrical element lever connection can also be used in other embodiments of a connecting rod with an eccentrical element adjustment device. Thus, it is possible for example to arrange the switch valve 5 in the portion of the connecting rod cover 21, Furthermore the described check valves 18, 19 can be provided integrated in the switch valve 5. Also the hydraulic supply of the hydraulic chambers 14, 15 can deviate from the described embodiment.

What is claimed is:
1. A method for producing an eccentrical element lever of a the connecting rod including:
    a crank bearing eye for connecting the connecting rod with a crank shaft of a variable compression internal combustion engine;
    a connecting rod bearing eye configured to connect the connecting rod with a cylinder piston of the variable compression internal combustion engine; and
    an eccentrical element adjustment arrangement configured to adjust an effective connecting rod length, wherein the eccentrical element adjustment arrangement includes an eccentrical element that cooperates with an eccentrical element lever, wherein the eccentrical element is configured to receive a wrist pin of the cylinder piston, wherein the eccentrical element adjustment arrangement includes at least one cylinder with a piston that is displaceably supported in a cylinder bore hole and connected with a support rod, wherein the eccentrical element lever includes two eccentrical element lever segments which are connected by at least one connecting bolt to which the support rod is pivotably connected, and wherein the at least one connecting bolt is configured as a cylindrical roller which protrudes with end portions at outer surfaces of the eccentrical element lever segments and which is heat treated at least in the end portions, the method comprising the steps:

preassembling the two eccentrical element lever segments by pressing the at least one connecting bolt in bearing bore holes of the eccentrical element lever segments, wherein the at least one connecting bolt is configured as a cylindrical roller which protrudes with the end portions at the outer surfaces of the eccentrical element lever segments; and performing a heat treatment at least at the end portions, wherein a penetration depth of the heat treatment is selected so that only a surface portion of the end portions is heat treated.

2. The method according to claim 1, wherein the end portions of the at least one connecting bolt are formed after the preassembly in the eccentrical element lever for axially securing the at least one connecting bolt.

3. The method according to claim 2, wherein the end portions are riveted.

4. The method according to claim 1, wherein the end portions are heat treated by a laser process or by an inductive process.

* * * * *